Sept. 9, 1952            L. C. GROAT            2,609,674
OVERLOAD RELEASE COUPLING FOR ELECTRICALLY DRIVEN EARTH AUGERS
Filed March 14, 1947            4 Sheets-Sheet 1
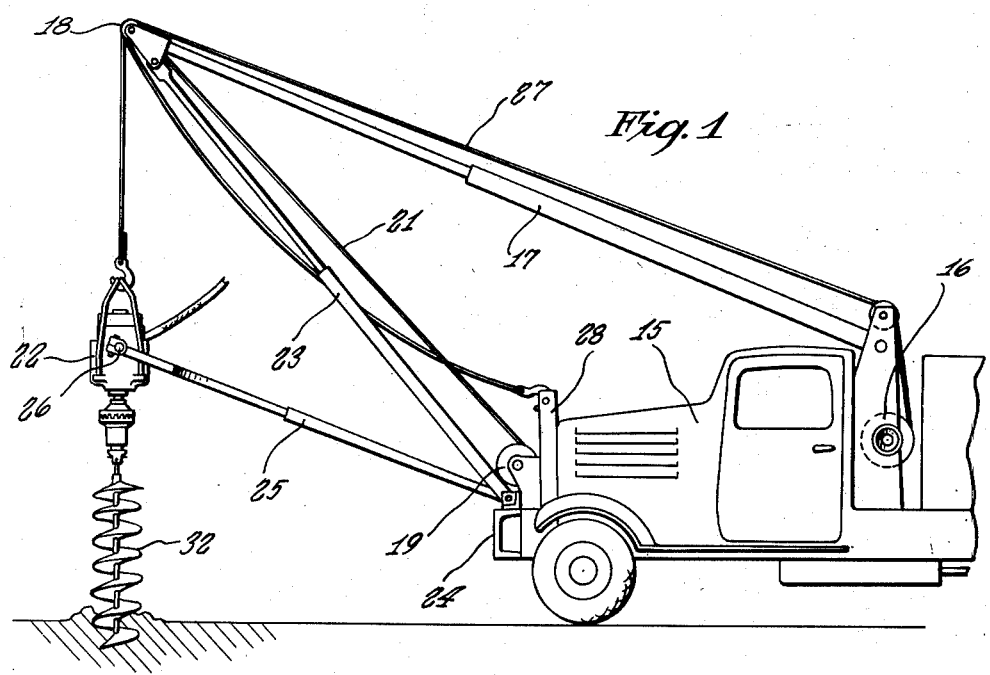
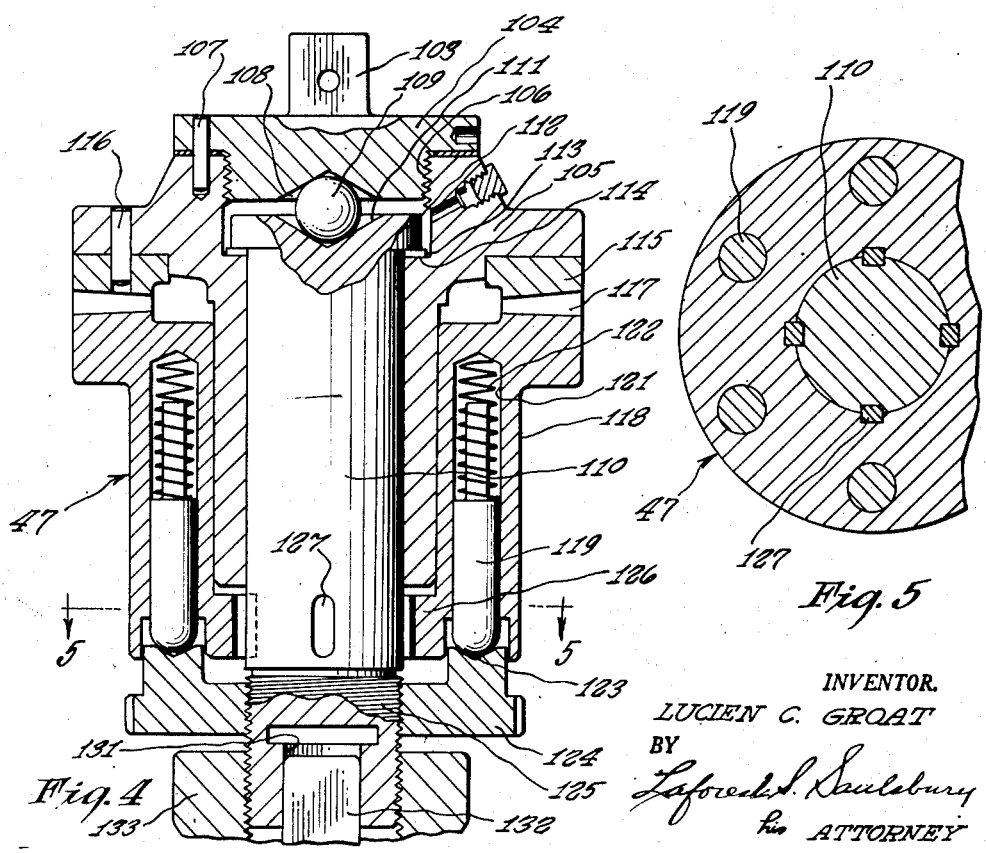
INVENTOR.
LUCIEN C. GROAT
BY
his ATTORNEY

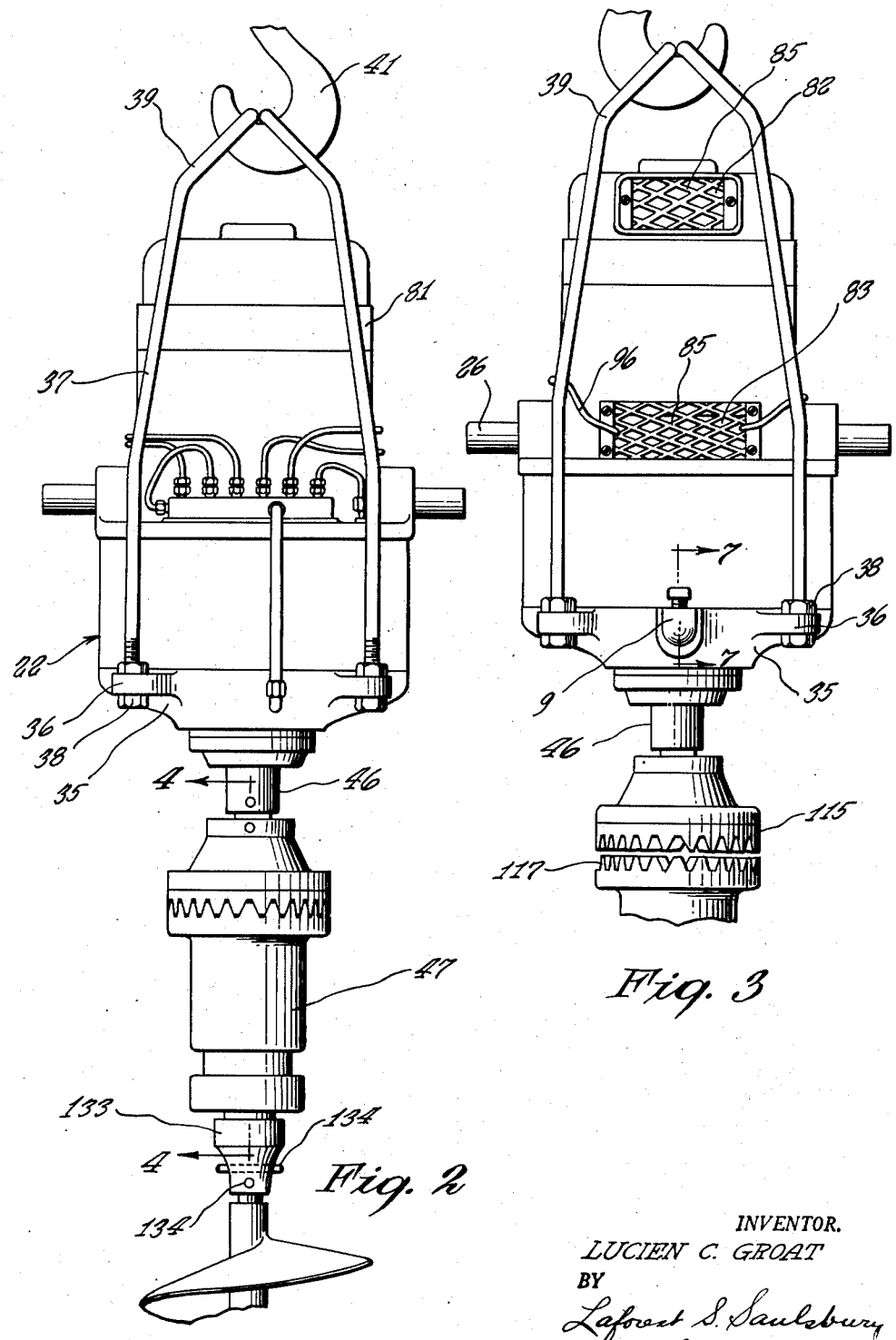

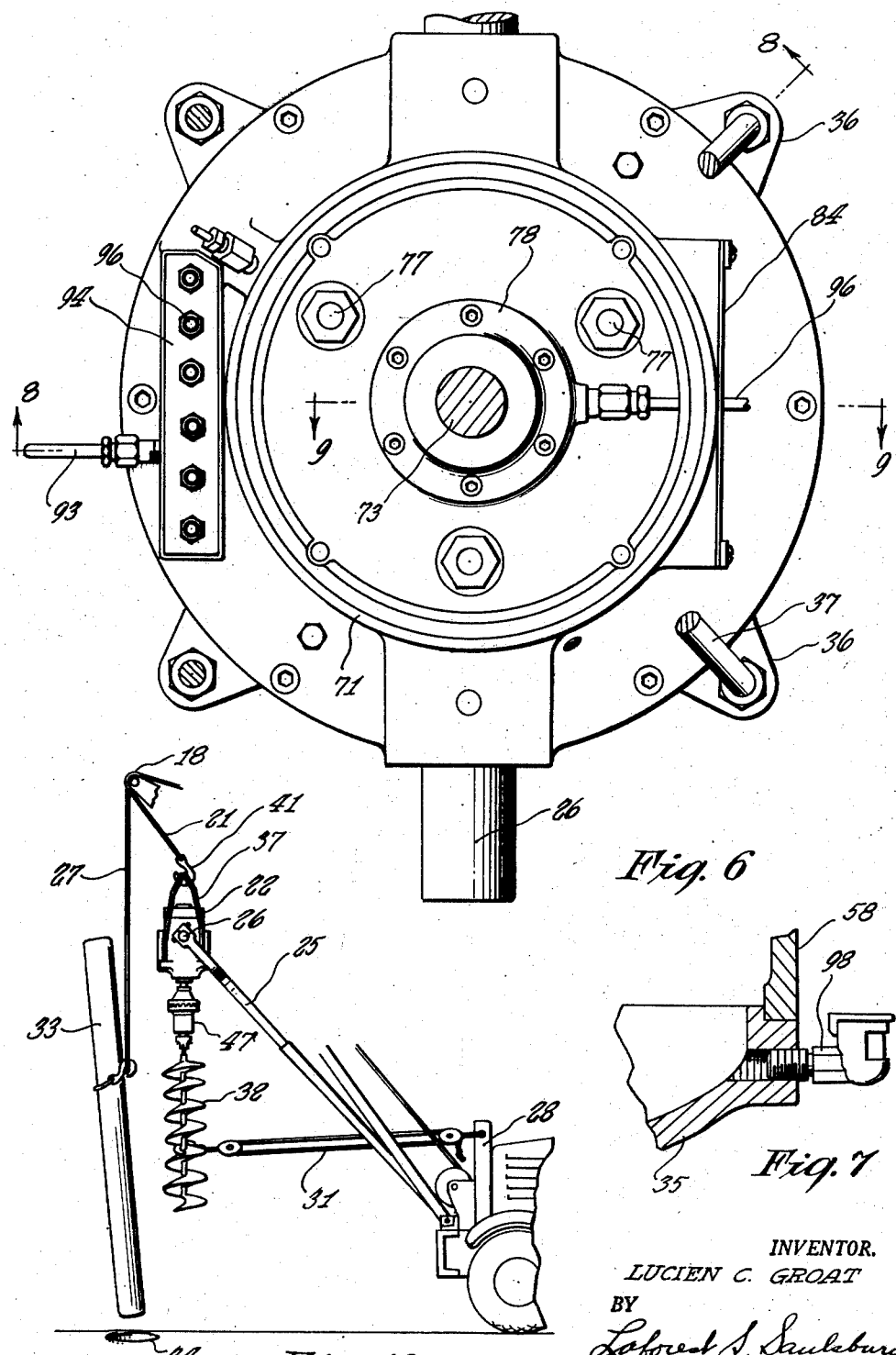

Sept. 9, 1952            L. C. GROAT            2,609,674
OVERLOAD RELEASE COUPLING FOR ELECTRICALLY DRIVEN EARTH AUGERS
Filed March 14, 1947            4 Sheets-Sheet 4

INVENTOR.
LUCIEN C. GROAT
BY
*Laforest S. Saulsbury*
ATTORNEY

Patented Sept. 9, 1952

2,609,674

UNITED STATES PATENT OFFICE 2,609,674

OVERLOAD RELEASE COUPLING FOR ELECTRICALLY DRIVEN EARTH AUGERS

Lucien C. Groat, Canton, Ill.

Application March 14, 1947, Serial No. 734,740

2 Claims. (Cl. 64—29)

This invention relates to an electrically driven earth auger adapted to drill holes in the ground for receiving power line poles.

It is an object of the present invention to provide an electric driven earth auger which can be mounted on a truck or tractor and transported to the location along the road or in the field where a hole is to be driven for the insertion of a power line pole and wherein the same apparatus may serve to set the pole within the completed hole.

It is another object of the present invention to provide an electric drive for use with earth augers which is of durable and simple construction, of compact design, easy to handle on the truck and which includes a clutch to which the auger can be attached and which is effective to protect the driving unit in case the auger engages a rock or large tree roots which would tend to damage either the auger or the drive.

It is another object of the present invention to provide a clutch adapted for use with an electric driving unit for earth augers, which is of simple construction, easy to install between the electric drive unit and the auger and efficient in operation.

It is still another object of the present invention to provide hanger members for supporting the parts from a hook on a cable which is externally connected to the driving unit parts and particularly to the base part and which can be readily engaged with the cable hook.

It is still another object of the present invention to provide a pressure operated lubricating system for an electric driving unit for augers wherein lubricating fluid will be taken from the base of the unit and force fed to the operating parts within the unit.

For other objects and for a better understanding of the invention, reference may be had to the following detailed description taken in connection with the accompanying drawing, in which Fig. 1 is a side elevational view of a truck on which the handling apparatus for the auger is mounted and with the driving units and the auger in a location to effect a drilling operation upon the ground.

Fig. 2 is an enlarged side elevational view of the electric drive unit and its clutch and with the auger connected to its lower end.

Fig. 3 is a side elevational view similar to Fig. 2 except taken from the opposite side of the electric drive unit and with the clutch unit disengaged as when an obstruction is engaged by the auger.

Fig. 4 is a cross-sectional view, in elevation, taken through the clutch device.

Fig. 5 is a transverse cross-sectional view taken on line 5—5 of Fig. 4.

Fig. 6 is an enlarged top plan view of the electric drive unit.

Fig. 7 is a fragmentary cross-sectional view taken of the filling cup in the base of the unit and on line 7—7 of Fig. 3 and looking in the direction of the arrows thereof.

Fig. 10 is a fragmentary view of the truck and the apparatus for supporting the electric auger and with the auger drawn inwardly toward the truck by a block and tackle and the pole cable suspending a pole within the hole drilled by the auger being put in use.

Figure 8:
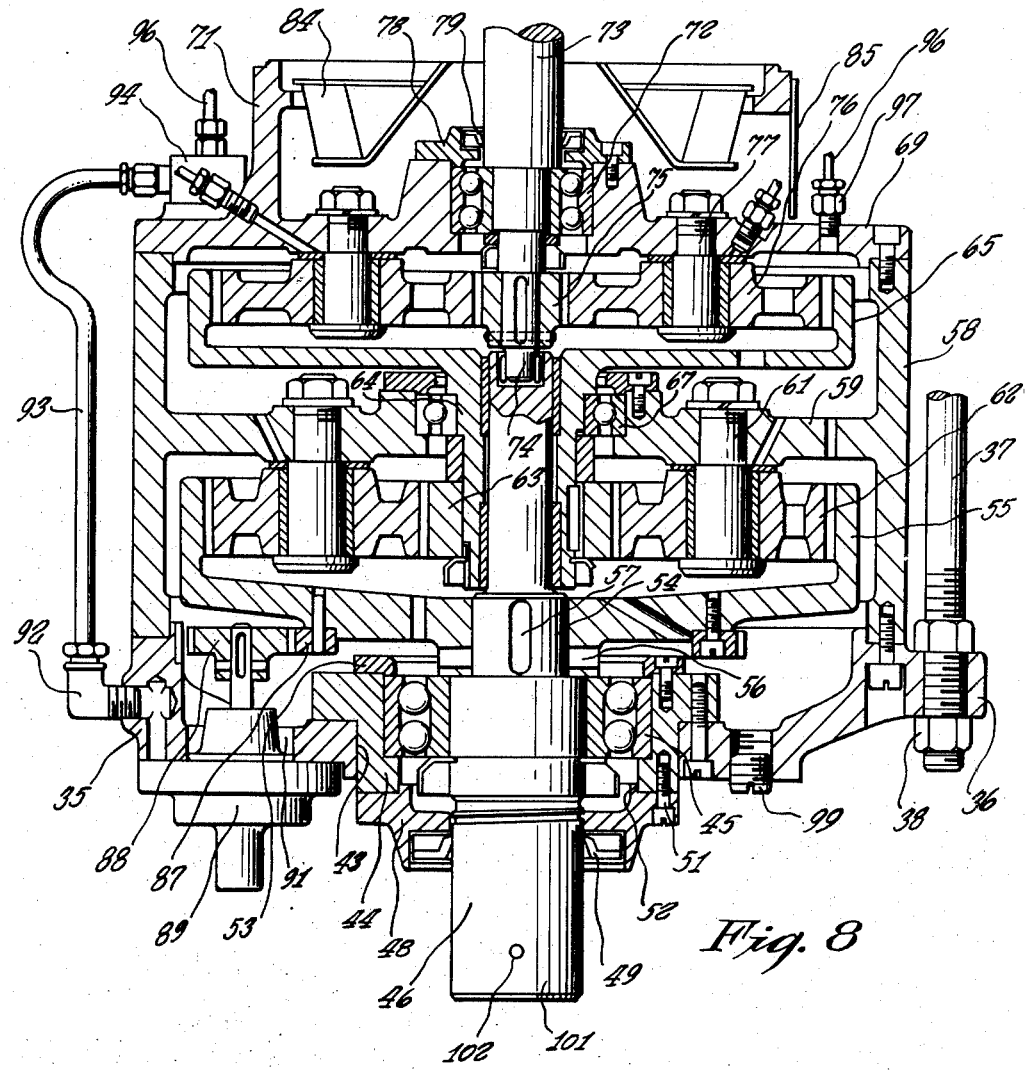
Fig. 8 is a cross-sectional view of the electric drive unit taken on line 8—8 of Fig. 6 and looking in the direction of the arrows thereof.

Referring now particularly to Figs. 1 and 10, 15 represents a truck on which my apparatus is mounted. In rear of its cab, there is connected a winch device 16 to which is anchored a forwardly extending derrick boom 17 having pulleys 18 on its upper end. In front of the hood of the truck 15 is a second winch device 19 which has a cable 21 that extends upwardly over one of the pulleys 18 for suspending from the derrick boom the electric drive auger 22 of the present invention. The boom 17 is supported in its raised position by a retractible boom 23 extending between a support 24 on the forward end of the truck and the upper end of the boom 17. Both of the booms 17 and 23 are formed of telescoping parts and can be adjusted so that the apparatus can be extended to different locations or can be retracted for the purpose of being transported by the truck. In order to keep the electric drive unit from twisting while in operation, there is provided a torque arm 25 connected between trunnions 26 on the electrical drive unit and the support 24 on the front of the truck.

While the drilling operation is being performed as in Fig. 1, cable 27 from winch device 16 is hooked to an upright support 28. After the hole has been drilled, the electric drive auger is pulled inwardly by a block and tackle device 31 connected between the auger 32 and the upright support 28 and in the manner as shown in Fig. 10. The torque arm 25 will have been swung upwardly. Thereafter the cable 27 will be unhooked from the support 28 and can be extended over a pole 33 as shown in Fig. 10 and the pole uprighted so that its bottom end will be aligned with a hole 34 which has been drilled by the auger 32. Upon lowering the pole, the pole will be set into the hole 34. The apparatus can now be transported by the truck 51 to a new location to place another pole. The entire operation is done with little manual effort and throughout the course of one day as many as one hundred poles can be set by the user of such apparatus.

Figure 9:
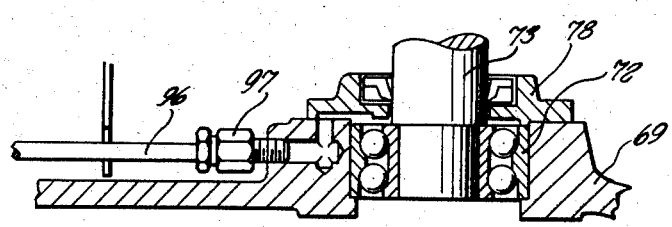
Fig. 9 is a fragmentary and cross-sectional view of the top part of the drive unit taken on line 9—9 of Fig. 6 and looking in the direction of the arrows thereof.

Referring now particularly to Figs. 2, 3, 6, 7, 8 and 9, the electric drive unit 22 is shown to comprise a base or bottom part 35 having laterally extending lug projections 36 thereon through which are extended U-shaped bails 37 and locked thereto by lock nuts 38. There are two of these bails, one at each side and the upper ends of the bails are bent toward one another as indicated at 39 so that a hook 41 can be disposed beneath both of them. The bails extend upwardly over the exterior of the electric drive unit and place no strain upon any of the parts except the base or bottom 35 on which the drive parts are supported.

Within the base 35 is an opening 43 into which is fitted a ring 44 supporting a ball bearing unit 45. Secured to this ball bearing unit is a shaft 46 which extends below the base 35 for attachment with a clutch unit 47. The bottom of the ring 44 is closed by a ring plate 48 having a packing gland 49 therewithin. The plate 48 is secured to the ring 44 by screws 51. The ring 44 is shouldered at 52 to receive the ball bearing unit 45 and to support the unit and the shaft 46 within the ring 44. The ball bearing unit 45 is held upon the shoulder against vertical displacement by a retainer 53. On a reduced diameter portion 54 of shaft 46, there is connected a ring gear 55 as by means of pins 56 and key 57.

Extending upwardly from the base 35 and supported thereon is a gear housing or drum 58 having a radially inwardly extending integral portion or partition 59, on which there are supported a plurality of circumferentially spaced shafts 61 having respectively small gears 62 thereon meshing with the ring gear 55. These gears 62 are rotated by a gear 63 keyed to a sleeve portion 64 extending downwardly from a ring gear 65 lying above the partition 59. Within the partition 59 there is fixed a ball bearing unit 67 for supporting the sleeve portion 64 of the ring gear 65.

On the top of the housing 58 is a cover plate 69 having an upwardly extending sleeve portion 71. This plate 69 supports a ball bearing unit 72 and a motor drive shaft 73. The motor drive shaft 73 has a pilot portion 74 which engages with the upper end of the shaft 46 and a sun gear 75 adapted to rotate gears 76 journalled respectively on stub shafts 77 depending from the plate 69. The ball bearing unit 72 is retained within the plate 69 by a retainer 78 having a packing gland 79 therein.

Supported upon the upper end of the sleeve portion 71 is an electric motor 81 having the shaft 73. This electric motor has a ventilating opening 82 and the sleeve portion 71 has a ventilating opening 83. Fan 84 causes the circulation of air through the electric motor and through the openings 82 and 83. The plate 69 has the laterally extending trunnions 26 to which the torque arm 25 is attached. Screens 85 are placed over the openings 82 and 83.

With the electric motor operating, gear 75 will be driven so as to operate the gears 76 and the ring gear 65, these gears forming the first gear reduction unit. Through the sleeve portion 64, gear 63, small gears 62 and ring gear 55 will be driven. These gears constitute the second gear reduction unit. It should thus be apparent that the speed reduction is effected by two gear reduction arrangements or units compactly arranged within a single housing 58.

Fixed to the bottom of the ring gear 55 is a ring gear 87 meshing with driving gear 88 of an oil pump 89 fixed into an opening 91 in the base 35. This pump 89 delivers oil collected within the base 35 through a fitting 92 and pipe 93 to an oil distributing box 94. From this distributing box there are extended a plurality of oil delivery tubes 96 for delivering oil under pressure to the movable parts of the unit. These pipes 96 connect to the casing or the top plate 69 by fittings 97. Hence, oil is taken out of the base and delivered to the movable parts to lubricate them. Certain of the delivery tubes 96 may extend through the screen mesh 85 as shown in Fig. 3.

In Figs. 3 and 7, there is shown an oil filling cup 98 through which oil is delivered to the bottom base 35 to be received by the pump 89. If it is desired to drain the oil from the base 35, plug 99 will be removed from the base, Fig. 8.

The shaft 46 has a square opening 101 in its bottom end and a hole 102 through which a pin can be extended to fix a square projection 103 of the clutch 47 to the shaft 46, Fig. 4. The projection 103 is on a plate 104 of the clutch 47. This plate 104 is threaded to the upper end of a clutch casing part 105 as indicated at 106. The plate 104 is retained against turning movement by a pin 107. Within the bottom face of the plate 104 is a tapered or conical-shaped recess 108 for receiving a ball 109 adapted to assume upward thrust when the auger is in the drilling position. Extended through the casing part 105 is a shaft 110 having a complementary conical-shaped recess 111 in its upper face for receiving the ball 109. The upper end of the shaft 110 has a flange 112, resting upon a bearing washer or wear plate 113 and a shoulder 114 of the casing part 105.

The casing part 105 has fixed to it a ring gear 115. Pins 116 retain the ring gear on the part 105 against rotation. This ring gear meshes with a gear formation 117 on an exterior casing part 118 surrounding the casing part 105 and the shaft 110. This part 118 has a plurality of circumferentially spaced spring detent elements 119 lying within holes 121 and pressed downwardly by springs 122. These detents 119 are rounded on their ends and are adapted with springs 122 to support the casing part 118 in a raised position so that its gear formation 117 normally remains in mesh with the gear 116 of the part 105. The detents 119 rest in recesses 123 in a plate 124 adjustably screw threaded to a threaded formation 125 on the lower end of shaft 110. The part 118 has a radially inwardly extending portion 126 which is keyed as indicated at 127 to the shaft 110. As the casing part 105 is driven by the driving unit, the casing part 118 will likewise be driven and through this casing part 118 shaft 110 will be driven. Should the auger meet with an obstruction, such as a rock or a root of a large tree, to prevent the turning of the same, gear 115 will reject the gear formation 117 and the casing part 118 so as to disconnect the part 105 from the part 118. The casing part 118 will drop downwardly against the action of detents 119 and springs 122. In threaded formation 125 of the shaft 110 is a square opening 131 for receiving a square shank 132 of the auger 32.

Extending downwardly over the shank 132 and screw threaded to the threaded formation 125 is a sleeve 133. This sleeve extends down onto the auger shank and is fixed thereto by tapered pins 134, Fig. 2. There is no twisting stress on this sleeve because the auger is driven through the connection of its square recess opening 131. The sleeve 133 and tapered pin 134 simply hold the auger up into the square opening and renders the whole assembly more rigid.

The auger 32 may be of any standard make having a square shank 132 for fitting the shaft 110. It will be apparent that the auger and the clutch are held in suspension from the output shaft 46 of the driving unit. The upward thrust of the auger is assumed in the clutch by the ball 109.

It should now be apparent that there has been provided a rugged and compact electric drive auger adapted to be suspended from a derrick arrangement of a truck and carried from one location to another with little difficulty and wherein the same derrick arrangement can be used to raise power line pole into the hole formed by the auger.

I claim:

1. A self-contained unitary clutch adapted to be connected to the output shaft of an earth auger drive unit to be supported therefrom and to drive and support an earth auger element, which comprises a top plate having means thereon adapted to cooperate with the output shaft of the earth auger drive unit to releasably connect the unitary clutch therewith, a casing part secured to said top plate and having gear teeth thereon, a vertical driven clutch shaft journalled in the said casing part and extending downwardly therefrom, means on the vertical driven shaft cooperating with said casing part to retain said driven shaft against downward displacement therefrom, a second casing part surrounding the first casing part, said second casing part having gear teeth meshing with the gear teeth of the first mentioned casing part, a bottom plate adjustably secured to the lower end of the vertical driven clutch shaft, depressible detent means reacting between the said bottom plate and the second casing part for normally retaining said second casing part with its teeth in engagement with the teeth of the first mentioned casing part, a spline drive connection between the second casing part and the vertical driven clutch shaft and means on the lower end of the vertical driven clutch shaft adapted for the connection thereto of an earth auger element.

2. A self-contained unitary clutch as defined in claim 1, and said vertical driven clutch shaft having a tapered recess on its upper end, said top plate having an opposing tapered recess in its bottom face, and a thrust ball acting in the recesses to assume the thrust created by the parts as the auger element is being worked in the earth.

LUCIEN C. GROAT.

REFERENCES CITED

The following references are of record in the file of this patent:

UNITED STATES PATENTS

| Number | Name | Date |
| --- | --- | --- |
| 804,458 | Eddy | Nov. 14, 1905 |
| 1,377,575 | Greve | May 10, 1921 |
| 1,398,551 | Hanson | Nov. 29, 1921 |
| 1,477,709 | Lebus | Dec. 18, 1923 |
| 1,507,776 | Humiston | Sept. 9, 1924 |
| 1,518,634 | Cason | Dec. 9, 1924 |
| 1,554,081 | Garrett | Sept. 15, 1925 |
| 1,571,077 | Washa | Jan. 26, 1926 |
| 1,641,926 | Genung | Sept. 6, 1927 |
| 1,656,582 | Harder | Jan. 17, 1928 |
| 1,754,348 | Browne | Apr. 15, 1930 |
| 1,864,844 | Maunier | June 28, 1932 |
| 2,031,337 | Spalding | Feb. 18, 1936 |
| 2,081,200 | Hollingsworth | May 25, 1937 |
| 2,105,091 | MacKay | Jan. 11, 1938 |
| 2,251,013 | Donley et al. | July 29, 1941 |
| 2,320,379 | Niekamp | June 1, 1943 |
| 2,443,212 | Weber | June 15, 1948 |
| 2,501,648 | Ogden | Mar. 21, 1950 |